(12) United States Patent
Winfield

(10) Patent No.: US 8,534,188 B1
(45) Date of Patent: Sep. 17, 2013

(54) CHEESECAKE PAN SYSTEM

(76) Inventor: Barbara A. Winfield, Shreveport, LA (US)

( * ) Notice: Subject to any disclaimer, the term of this patent is extended or adjusted under 35 U.S.C. 154(b) by 90 days.

(21) Appl. No.: 13/223,823

(22) Filed: Sep. 1, 2011

(51) Int. Cl.
G07F 9/10 (2006.01)
H05B 6/80 (2006.01)

(52) U.S. Cl.
USPC .............................................. 99/357; 219/725

(58) Field of Classification Search
USPC ................... 99/355–357, 324, 426, 340, 341, 99/444, 501–513; 219/725, 730, 731, 732
See application file for complete search history.

(56) References Cited

U.S. PATENT DOCUMENTS

| | | |
|---|---|---|
| 3,641,926 A | 2/1972 | Williams et al. |
| 4,099,512 A | 7/1978 | Noonan |
| 4,528,975 A | 7/1985 | Wang |
| 4,574,776 A | 3/1986 | Hidle |
| 4,922,079 A | 5/1990 | Bowen et al. |
| 5,235,904 A | 8/1993 | Ludena |
| 5,287,798 A | 2/1994 | Takeda |
| 5,584,232 A | 12/1996 | Bush |
| 5,730,045 A * | 3/1998 | Delaquis et al. ................ 99/337 |
| D396,600 S | 8/1998 | Otero |
| 7,478,588 B2 * | 1/2009 | Miller et al. ..................... 99/426 |
| 2004/0216620 A1 | 11/2004 | Quiggins et al. |
| 2007/0257166 A1 * | 11/2007 | Christopherson .......... 248/205.5 |
| 2010/0051626 A1 * | 3/2010 | Moom et al. ................ 220/573.1 |
| 2010/0260909 A1 * | 10/2010 | McPheron et al. ............ 426/523 |

OTHER PUBLICATIONS

Pyrex Products, Making Cooking a Little Easier, Oct. 17, 2009.*

* cited by examiner

*Primary Examiner* — Sang Paik
*Assistant Examiner* — Renee L Miller

(57) ABSTRACT

A cheesecake pan system having a bottom plate, a pan rim having a side wall and a hollow center, a lip on an inner surface, the bottom plate temporarily rests atop the lip, a water base having a bottom surface and a side wall that together form an enclosure for holding water, the side wall has a top and bottom edge, a locking means allow the water base and the pan rim to engage each other, a vapor hole in the side wall, a vacuum mount base removably attached to the bottom edge of the side wall a distance below the bottom surface of the water base, the bottom surface, the side wall, and the vacuum mount base together form a bottom cavity, and a vacuum locking means to secure the vacuum mount base to the water base.

6 Claims, 4 Drawing Sheets

(ISO View)

(ISO View)

(Front View)

(Back View)

(Cross-sectional View)

CHEESECAKE PAN SYSTEM

FIELD OF THE INVENTION

The present invention is directed to a pan for baking cheesecakes.

BACKGROUND OF THE INVENTION

Oftentimes water is put in a pan and placed under a cheesecake baking in the oven. The present invention features a novel cheesecake pan system. The system comprises a removable bottom pan for holding water. The system helps eliminate the need to use a separate pan for water in the oven and helps to create even heat distribution for baking.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
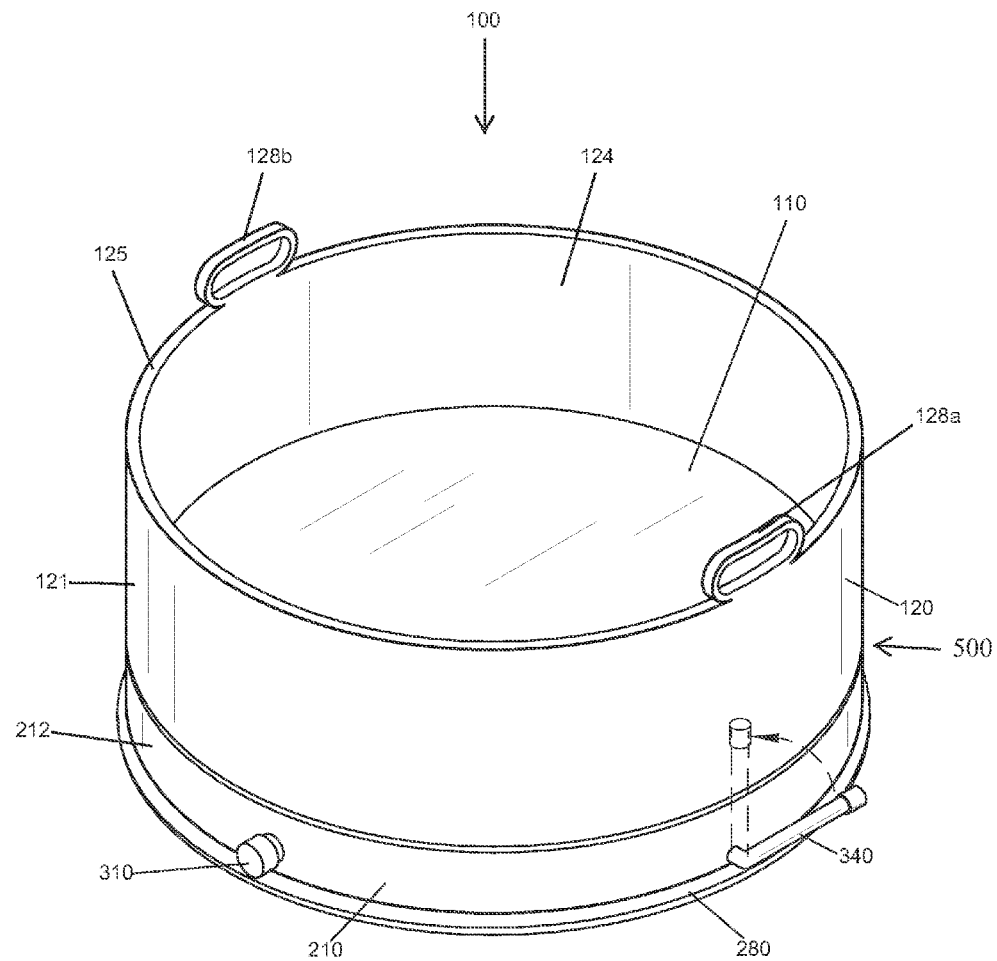
FIG. 1 is a perspective view of the system of the present invention.

Referring now to FIG. 1-5, the present invention features a novel cheesecake pan system 100. The system 100 comprises a bottom plate 110. The bottom plate 110 is generally circular in shape. The bottom plate 110 resembles a bottom plate of a standard springform pan. Springform pans are well known to one of ordinary skill in the art.

The system 100 further comprises a pan rim 120. The pan rim 120 is attachable to the bottom plate 110. The pan rim 120 has a side wall 121 and a hollow center 121a. The pan rim 120 resembles rims of standard springform pans well known to one of ordinary skill in the art. For example, the pan rim 120 is circular (as viewed from above) with a hollow center. The side wall 121 of the pan rim 120 is elevated to provide room for a cake. In some embodiments, a first handle 128a and a second handle 128b are disposed on the top edge 125 of the pan rim 120.

Figure 2:
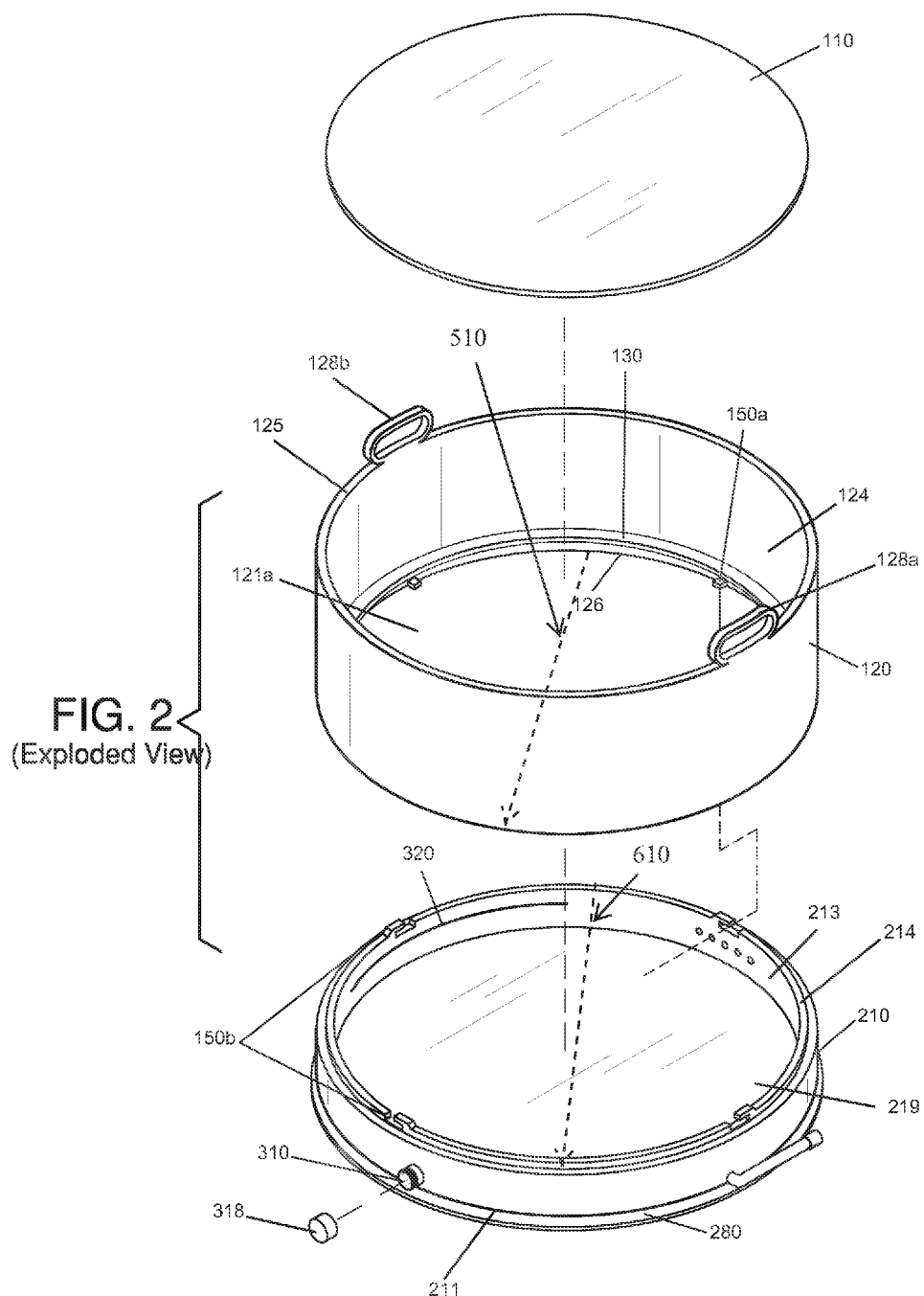
FIG. 2 is an exploded view of the system of the present invention.
Figure 3:
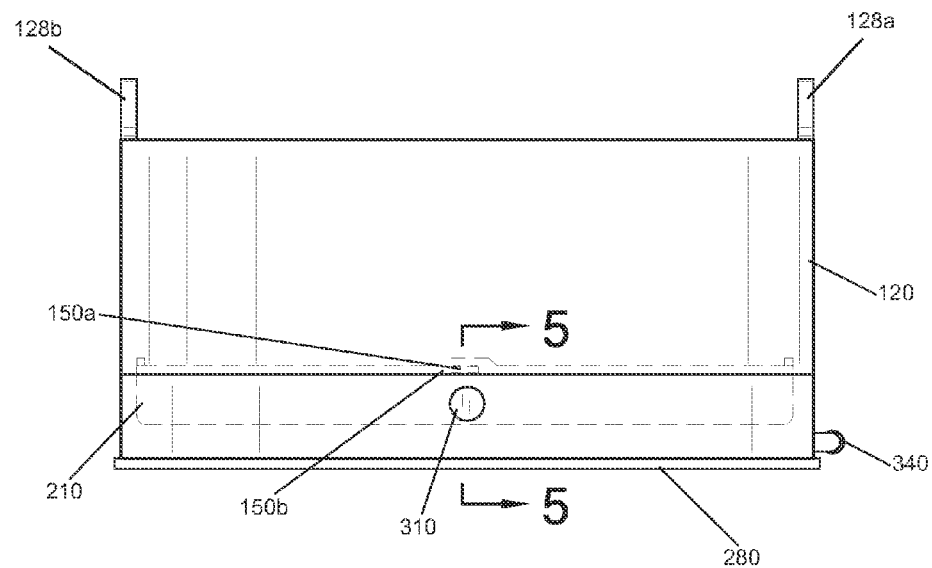
FIG. 3 is a front view of the system of the present invention.
Figure 4:
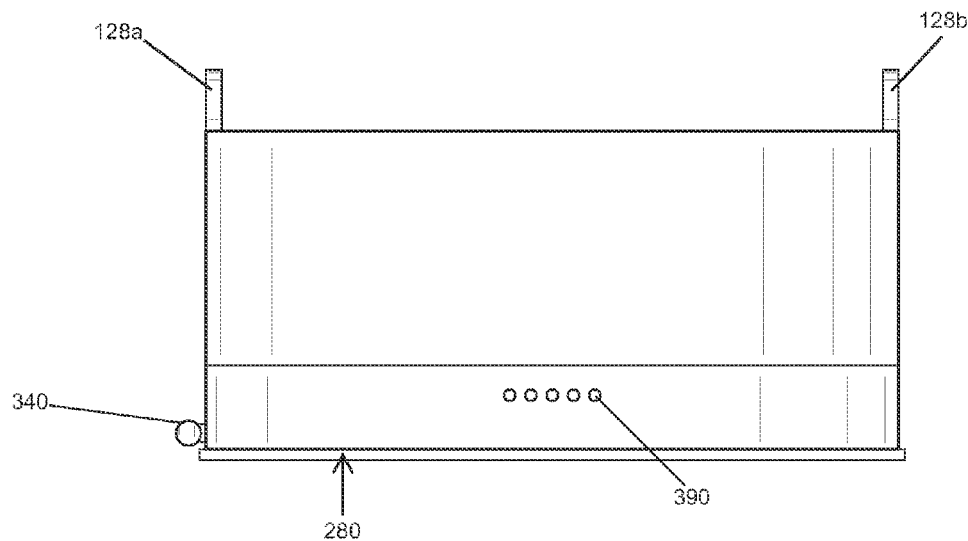
FIG. 4 is a back view of the system of the present invention.
Figure 5:
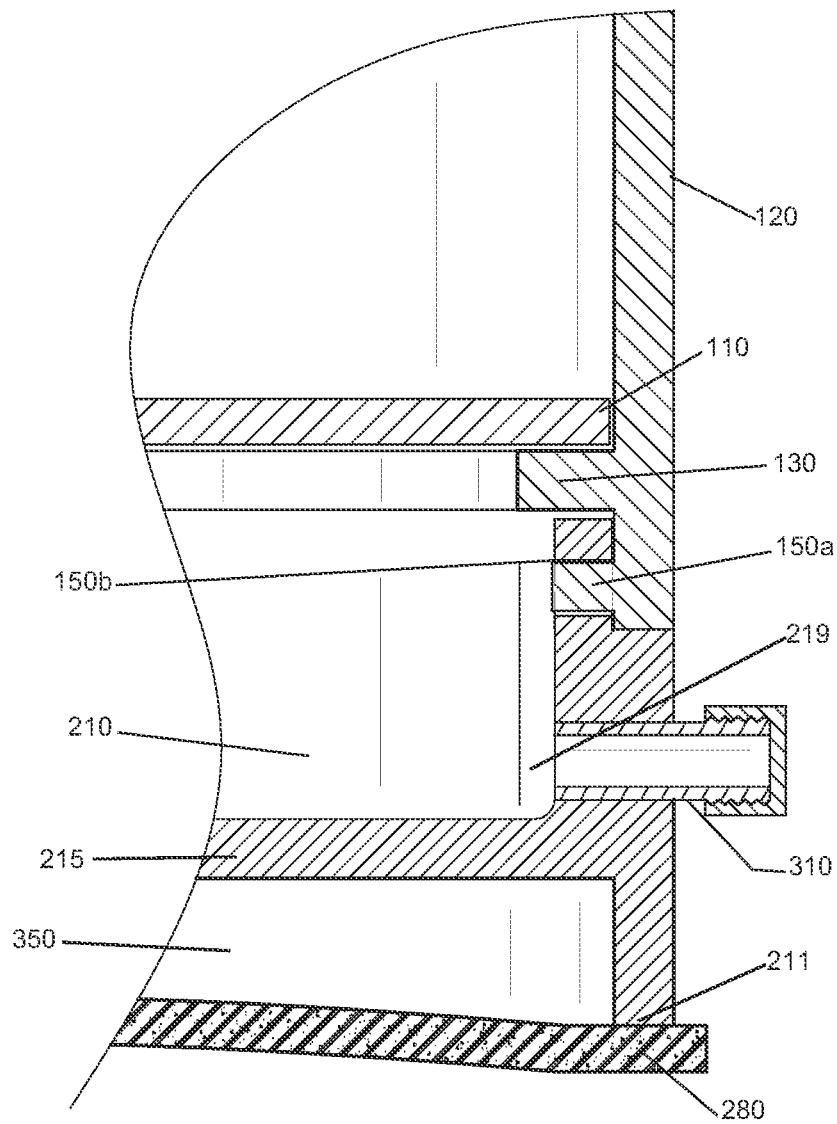
FIG. 5 is a cross sectional view of the system of FIG. 3.

As shown in FIG. 2, a lip 130 is disposed on the inner surface 124 of the pan rim 120, e.g., a distance above the bottom edge 126. The lip 130 provides a surface on which the bottom plate 110 can rest (e.g., similar to a standard springform pan well known to one of ordinary skill in the art). FIG. 5 shows the bottom plate 110 engaged with the pan rim 120 wherein the bottom plate 110 rests atop the lip 130 of the pan rim 120. The pan rim 120 and the bottom plate 110 create a tight seal so that cakes or other material does not leak between the two pieces.

The system 100 further comprises a water base 210. The water base 210 comprises a bottom surface 215 and a side wall 212 that together form an enclosure 219 for holding water. The side wall 212 has a top edge 214, a bottom edge 211, and an inner surface 213. Generally, the top edge 214 of the side wall 212 of the water base 210 engages the pan rim 120.

The water base 210 and the pan rim 120 engage each other (e.g., temporarily) via a base locking means. For example, a first half locking means 150a (e.g., a locking pin) is disposed on the bottom edge of the pan rim 120 and a second half locking means 150b (e.g., locking slot) is disposed on the side wall 212 (e.g., the top edge 214 of the side wall 212) of the water base 210. In some embodiments, the first half locking means 150a is a locking pin. In some embodiments, the second half locking means 150b is a locking slot. Such locking pins and slots are well known to one of ordinary skill in the art. The present invention is not limited to the aforementioned base locking means. For example, in some embodiments, the base locking means includes a snap mechanism, a latch mechanism, a magnet mechanism, the like, or a combination thereof. The locking means 150 create a tight seal between the water base 210 and the side wall pan rim 120.

In some embodiments, a drain valve 310 is disposed in the side wall 212 of the water base 210. The drain valve 310 fluidly connects the enclosure 219 of the water base 210 to outside of the water base 210. The drain valve 310 allows water to be drained from the water base 210. In some embodiments, a cap 318 is removably attached to the drain valve 310. The cap 318 can move between at least an on position and an off position respectively allowing and preventing function of the drain valve 310.

In some embodiments, a line 320 is disposed (e.g., etched, etc.) on the inner surface 213 of the side wall 212 of the water base 210. The line 320 may be used as a reference of the user to indicate to the user how much water should be added to the water base 210. Such lines or markers are well known to one of ordinary skill in the art.

As shown in FIG. 5, in some embodiments, a vacuum mount base 280 is removably attachable to the bottom edge 211 of the side wall 212 of the water base 210 below the bottom surface 215 of the water base 210 (e.g., a distance below the bottom surface 215 of the water base 210. A bottom cavity 350 (e.g., a vacuum) is formed when the vacuum mount base 280 engages the water base 210 between the bottom surface 215 of the water base, the side wall 212 of the water base 210, and the vacuum mount base 280.

The vacuum mount base 280 can be secured to the water base 210 (e.g., the side wall 212) via a vacuum locking means 340, for example a vacuum mount lever and/or the like. Such vacuum mount levers and the like are well known to one of ordinary skill in the art. In some embodiments, the vacuum mount lever is a knob.

In some embodiments, one or more vapor holes 390 are disposed in the side wall 212 of the water base 210. The vapor holes 390 provide a means for the steam in the enclosure 219 to escape.

The system 100 of the present invention may be constructed in a variety of sizes, designs, styles, and from a variety of materials. In some embodiments, the system 100 may be constructed from a variety of materials including but not limited to a material comprising stainless steel.

As used herein, the term "about" refers to plus or minus 10% of the referenced number. For example, an embodiment wherein the bottom plate 110 is about 10 inches in diameter includes a bottom plate that is between 9 and 11 inches in diameter.

The disclosures of the following U.S. Patents are incorporated in their entirety by reference herein: U.S. Pat. No. 3,641,926; U.S. Pat. No. 4,099,512; U.S. Pat. No. 4,528,975; U.S. Pat. No. 4,574,776; U.S. Pat. No. 4,922,079; U.S. Pat. No.

5,235,904; U.S. Pat. No. 5,287,798; U.S. Pat. No. 5,584,232; U.S. Design Patent No. D396,600; U.S. Patent Applications No. 2004/0216620.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A cheesecake pan system (100) comprising:
   (a) a bottom plate (110);
   (b) a pan rim (120) having a side wall (121) and a hollow center (121a), wherein a lip (130) is disposed on an inner surface (124) of the pan rim (120), the bottom plate (110) temporarily rests atop the lip (130) of the pan rim (120),
   wherein the pan rim comprises a lower edge (500);
   wherein the lower edge (500) of the pan rim has a redetermined first diameter (510);
   (c) a water base (210) comprising a bottom surface (215) and a side wall (212) that together form an enclosure (219) for holding water, the side wall (212) has a top edge (212) and a bottom edge (211)
   wherein the top edge (212) of the water base has a predetermine second diameter (610);
   wherein the predetermined first diameter (510) of the lower edge of the pan rim is the same as that of the predetermined second diameter (610) of the top edge of the water base such that the lower edge (500) of the pan rim rests entirely on the top edge (212) of the water base;
   (d) a first half locking means (150a) disposed on the bottom edge (211) of the pan rim (120) and a second half locking means (150b) disposed on the side wall (212) of the water base (210) near the top edge (214), the locking means (1150) allow the water base (210) and the pan rim (120) to removably engage each other;
   (e) a vapor hole (390) disposed in the side wall (212) of the water base (210);
   (f) a vacuum mount base (280) removably attached to the bottom edge (211) of the side wall (212) of the water base (210) a distance below the bottom surface (215) of the water base (210), the bottom surface (215) of the water base (210), the side wall (212) of the water base (210), and the vacuum mount base (280) together form a bottom cavity (350);
   (g) a vacuum locking means (340) functioning to secure the vacuum mount base (280) to the water base (210);
   (h) a drain valve (310) disposed in the side wall (212) of the water base (210), the drain valve (310) fluidly connects the enclosure (219) of the water base (210) to outside the water base (210); and
   (i) a cap (318) removably attached to the drain valve (310), the cap (318) can move between at least an on position and an off position respectively allowing and preventing function of the drain valve (310).

2. The system (100) of claim 1, wherein the bottom plate (110) is circular.

3. The system (100) of claim 1 further comprising a first handle (128a) disposed on a top edge (125) of the pan rim (120).

4. The system (100) of claim 1, wherein the first half locking means (150a) is a locking pin and the second half locking means (150b) is a locking slot.

5. The system (100) of claim 1 further comprising a line (320) disposed on an inner surface (213) of the side wall (212) of the water base (210).

6. A cheesecake pan system (100) consisting of:
   (a) a bottom plate (110);
   (b) a pan rim (120) having a side wall (121) and a hollow center (121a), wherein a lip (130) is disposed on an inner surface (124) of the pan rim (120), the bottom plate (110) temporarily rests atop the lip (130) of the pan rim (120),
   wherein the pan rim comprises a lower edge (500);
   wherein the lower edge (500) of the pan rim has a predetermined first diameter (510);
   (c) a water base (210) comprising a bottom surface (215) and a side wall (212) that together form an enclosure (219) for holding water, the side wall (212) has a top edge (212) and a bottom edge (211)
   wherein the top edge (212) of the water base has a predetermined second diameter (610);
   wherein the predetermined first diameter (510) of the lower edge of the pan rim is the same as that of the predetermined second diameter (610) of the top edge of the water base such that the lower edge (500) of the pan rim rests entirely on the top edge (212) of the water base;
   (d) a first half locking means (150a) disposed on the bottom edge (211) of the pan rim (120) and a second half locking means (150b) disposed on the side wall (212) of the water base (210) near the top edge (214), the locking means (150) allow the water base (210) and the pan rim (120) to removably engage each other;
   (e) a vapor hole (390) disposed in the side wal (212) of the water base (210);
   (f) a vacuum mount base (280) removably attached to the bottom edge (211) of the side wall (212) of the water base (210) a distance below the bottom surface (215) of the water base (210), the bottom surface (215) of the water base (210), the side wall (212) of the water base (210), and the vacuum mount base (280) together form a bottom cavity (350);
   (g) a vacuum locking means (340) functioning to secure the vacuum mount base (280) to the water base (210);
   (h) a drain valve (310) disposed in the side wall (212) of the water base (210), the drain valve (310) fluidly connects the enclosure (219) of the water base (210) to outside the water base (210); and
   (i) a cap (318) removably attached to the drain valve (310), the cap (318) can move between at least an on position and an off position respectively allowing and preventing function of the drain valve (310).

* * * * *